United States Patent
Werner et al.

(10) Patent No.: US 11,616,616 B2
(45) Date of Patent: Mar. 28, 2023

(54) REFERENCE SIGNALING FOR RADIO ACCESS NETWORKS

(71) Applicant: Telefonaktiebolaget LM Ericsson (publ), Stockholm (SE)

(72) Inventors: Karl Werner, Segeltorp (SE); Lars Lindbom, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 67 days.

(21) Appl. No.: 17/047,047

(22) PCT Filed: Apr. 13, 2018

(86) PCT No.: PCT/SE2018/050380
§ 371 (c)(1),
(2) Date: Oct. 12, 2020

(87) PCT Pub. No.: WO2019/199213
PCT Pub. Date: Oct. 17, 2019

(65) Prior Publication Data
US 2021/0160027 A1 May 27, 2021

(51) Int. Cl.
| | |
|---|---|
| H04L 5/00 | (2006.01) |
| H04B 7/06 | (2006.01) |
| H04L 1/1829 | (2023.01) |
| H04L 27/26 | (2006.01) |
| H04W 72/0446 | (2023.01) |
| H04W 72/12 | (2023.01) |
| H04W 72/04 | (2023.01) |

(52) U.S. Cl.
CPC ......... *H04L 5/0048* (2013.01); *H04B 7/0617* (2013.01); *H04L 1/1861* (2013.01); *H04L 5/0023* (2013.01); *H04L 27/2621* (2013.01); *H04W 72/042* (2013.01); *H04W 72/0446* (2013.01); *H04W 72/1289* (2013.01)

(58) Field of Classification Search
None
See application file for complete search history.

(56) References Cited

U.S. PATENT DOCUMENTS 9,712,299 B2 * 7/2017 Tong ................... H04J 13/0003
2010/0034186 A1 2/2010 Zhou et al.
(Continued)

OTHER PUBLICATIONS

International Search Report and Written Opinion of the International Searching Authority for PCT International Application No. PCT/SE2018/050380 dated Dec. 14, 2018.
(Continued)

*Primary Examiner* — Bob A Phunkulh
(74) *Attorney, Agent, or Firm* — Sage Patent Group

(57) ABSTRACT

There is disclosed a method of operating a signaling radio node in a radio access network, the signaling radio node being adapted for transmitting on a plurality of layers utilizing an antenna arrangement; wherein the method comprises transmitting, on each of the plurality of layers, reference signaling in the same symbol time interval, wherein reference signaling on at least a first layer of the plurality of layers is shifted in time and/or phase relative to reference signaling on at least a second layer of the plurality of layers. There are also disclosed related methods and devices.

18 Claims, 3 Drawing Sheets

(56) References Cited

U.S. PATENT DOCUMENTS

| | | | | |
|---|---|---|---|---|
| 2013/0039332 A1* | 2/2013 | Nazar | ................... | H04B 7/0452 |
| | | | | 370/330 |
| 2013/0051371 A1* | 2/2013 | Ko | ........................ | H04L 1/1861 |
| | | | | 370/335 |
| 2013/0176987 A1* | 7/2013 | Kawamura | ............. | H04L 5/005 |
| | | | | 370/330 |
| 2015/0327230 A1* | 11/2015 | Takeda | .................... | H04L 5/001 |
| | | | | 370/329 |
| 2017/0141896 A1* | 5/2017 | Yang | ....................... | H04B 7/068 |
| 2017/0288837 A1* | 10/2017 | Namgoong | ............ | H04L 5/0051 |
| 2017/0290046 A1 | 10/2017 | Sun et al. | | |
| 2018/0205589 A1* | 7/2018 | Bai | ..................... | H04L 27/2657 |
| 2019/0158259 A1* | 5/2019 | Park | ..................... | H04B 7/0626 |
| 2019/0379437 A1* | 12/2019 | Park | .................... | H04L 27/2614 |
| 2021/0021324 A1* | 1/2021 | Jakobsson | ............ | H04L 27/2607 |
| 2021/0160026 A1* | 5/2021 | Wang | .................... | H04L 5/0064 |

OTHER PUBLICATIONS

Ericsson, "Remaining issues on DMRS," R1-1802754, 3GPP TSG RAN WG1 Meeting #92, Athens, Greece, Feb. 26-30, 2018, 9 pages.

Ericsson, "draftCR to 38.211 capturing the Jan. 18 ad-hoc meeting agreements," 3GPP TSG-RAN1 Meeting AH18-01, Draft Change Request, R1-1801291, Vancouver, Canada, Jan. 22-26, 2018, 77 pages.

\* cited by examiner

REFERENCE SIGNALING FOR RADIO ACCESS NETWORKS

CROSS REFERENCE TO RELATED APPLICATION

This application is a 35 U.S.C. § 371 national stage application of PCT International Application No. PCT/SE2018/050380 filed on Apr. 13, 2018, the disclosure and content of which is incorporated by reference herein in its entirety.

TECHNICAL FIELD

This disclosure pertains to wireless communication technology, in particular in the context of radio access technology using massive beamforming or multiple-input multiple output (MIMO) approaches.

BACKGROUND

In modern wireless communication systems, there is increasing use of multiple antenna technology, e.g. to transmit in multiple layers and/or beams. In particular if the same antenna elements are used for multi-layer transmissions at the same time, significant power peaks and/or changes in power can occur, which can lead to significant demands on the transmission and reception systems, respectively associated power amplifiers.

SUMMARY

This disclosure aims at providing approaches allowing improved multi-antenna operation, in particular in the context of reference signaling. The approaches are particularly advantageously implemented in a 5th Generation (5G) telecommunication network or 5G radio access technology or network (RAT/RAN), in particular according to 3GPP (3$^{rd}$ Generation Partnership Project, a standardisation organization). A suitable RAN may in particular be a RAN according to NR, for example release 15 or later, or LTE Evolution.

There is disclosed a method of operating a signaling radio node in a radio access network. The signaling radio node is adapted for transmitting on a plurality of layers utilising an antenna arrangement. The method comprises transmitting, on each of the plurality of layers, reference signaling in the same symbol time interval, wherein reference signaling on at least a first layer of the plurality of layers is shifted in time and/or phase relative to reference signaling on at least a second layer of the plurality of layers.

Moreover, there is disclosed a signaling radio node for a radio access network, the signaling radio node being adapted for transmitting on a plurality of layers utilising an antenna arrangement. The signaling radio node further is adapted for transmitting reference signaling on each of the plurality of layers in the same symbol time interval, wherein reference signaling on at least a first layer of the plurality of layers is shifted in time and/or phase relative to reference signaling on at least a second layer of the plurality of layers. The signaling radio node may comprise, and/or be adapted for utilising processing circuitry and/or radio circuitry, in particular a transmitter and/or transceiver, for such transmitting. Alternatively, or additionally, it may comprise a corresponding transmitting module.

The reference signaling may be demodulation reference signaling (DMRS), or in some cases sounding reference signaling (SRS) or tracking reference signaling (TRS) or phase tracking reference signaling (PTRS). The reference signaling may be associated to, e.g. neighboring in time and/or frequency, other signaling, in particular control signaling, e.g. on a control channel like a physical channel, e.g. PUCCH or PDCCH or PSCCH, and/or data signaling, e.g. on a data channel like a physical channel, e.g. PUSCH or PDSCH or PSSCH. In general, the reference signaling may be in downlink or sidelink or uplink.

In general, from the plurality of layers, there may be one or more subsets of layers, wherein in each subset, layers are shifted relative to each other. Each subset may comprise 2 or more layers, e.g. a first, a second, and optionally a third, etc. layer.

It may generally be considered that the shift is frequency dependent. For a layer, different shifts may be applied to different elements or subcarriers carrying reference signaling and/or an associated modulation symbol. The shift for each element or subcarrier may be a function of the frequency (and/or subcarrier numbering) of the subcarrier and/or carrier and/or bandwidth part. The function may be monotonical, e.g. increasing or decreasing, in particular strictly monotonical. Each shift may be small.

A signaling radio node may be a radio node transmitting the reference signaling, in particular a network node. However, in some cases it may be implemented as a user equipment (UE) or terminal, e.g. for SRS and/or in uplink or sidelink. An antenna arrangement may comprise a plurality of antennas, e.g. for hybrid and/or digital beamforming, in which more than one antennas are controlled together by common circuitry, e.g. common feed by the same amplifiers. The signaling radio node may comprise, and/or be connected or connectable, to the antenna arrangement, which may be an antenna array and/or comprise a plurality of subarrays. A subarray may be controllable via common circuitry, e.g. for digital beamforming. In some cases, a subarray may be implemented as an antenna panel.

Each layer may be associated to a different port. A port may associate control parameters for beamforming to specific antennas, e.g. regarding phase and/or amplitude for transmission, and/or direction and/or angular extension and/or spatial extension of a transmission and/or beam. To a port may be associated a precoder providing corresponding parameters, e.g. for digital beamforming. A layer may in general represent transmission of distinct signaling. Different layers may be provided using the same antennas, e.g. by providing combined corresponding control information and/or power and/or timing of input signals for the layers to the antennas.

In particular, it may be considered that transmission on different layers shares antenna elements of the antenna arrangement, e.g. using the same antennas at the same time. Beams formed by transmission of the layers may point in the same or different directions. In some cases, the beams may at least partly overlap, or may not overlap, or a combination thereof for different beams.

For each layer, the reference signaling may be mapped in frequency domain to subcarriers according to a sequence. The reference signaling of different layers may be in the same frequency range, e.g. carrier and/or bandwidth part and/or range of subcarriers. It may be considered that the sequence identifies which subcarriers in the range carry reference signaling and which do not. It may be considered that subcarriers without reference signaling carry no other signaling, or control signaling or data signaling. A sequence may generally describe which signal (e.g., modulation symbol) is carried on the subcarrier as part of the reference signaling. Accordingly, the sequence may describe which resource elements carry which reference signal/reference modulation symbol. For different layers, different sequences may be utilised for mapping. However, for some layers, the same sequence may be used. Layers may generally be grouped into CDM groups, in which, based on the same original sequence, via code division multiplexing utilising in particular orthogonal cover codes (OCC), different sequences are used. The OCC and/or CDM may lead to reference symbols with different phase space representation in the group, representing different sequences. However, in particular for layers in different CDM groups, the same sequence may be used. In a subset of shifted layers, the layers may be from different CDM groups, which may be mapped utilising the same sequence. The layers of each CDM group may be mapped utilising different sequences. A sequence may be considered the same if without the shift it is the same.

The reference signaling may be shifted by applying a phase shift to elements of a sequence associated to a layer. An element may be a modulation symbol on one resource element. A constant phase shift may be used for each element, or the phase shift may vary between elements, e.g. linearly, and/or monotonously increasing or decreasing.

In general, the shift may correspond to a shift in time domain smaller than a cyclic prefix associated to transmission on the layer. In general, transmission on a layer may be associated to a numerology, to which there may be associated a cyclic prefix of a given length in time. The cyclic prefix may be a normal cyclic prefix or an extended cyclic prefix, e.g. depending on the carrier used for transmission. The layers may have the same numerology. The shift may be small in comparison to time interval corresponding to the cyclic prefix, in particular 10% or less, or 5% or less, or 1% or less, or 0.1% or less. In some cases, a small shift may be considered to correspond to 10 or less, or 5 or less, or 2 or less, or 1 sample of a FFT/DFFT associated to creating the waveform for transmitting. A shift for the layer may be considered small if each shift between elements and/or subcarriers carrying reference signaling and/or an associated modulation symbol is small as described herein. This may lead to corresponding shifts between corresponding elements of different layers.

It may be considered that reference signaling on the at least first layer is based on the same sequence as reference signaling of the at least second layer.

A layer may correspond to a transmission beam.

In some variants, a receiving radio node may be configured with a shift indication by the signaling radio node. The shift indication may be transmitted with control signaling. It may be considered that the shift indication indicates that a shift will be used for one or more layers, and/or for which layers, and/or which shift will be used. This may be particularly useful if the shift (e.g., at least for one element) corresponds to more than 10% of c cyclic shift in time, and/or a rotation of more than 10 degrees in the phase diagram. The signaling radio node may be adapted for transmitting a corresponding configuration and/or the shift indication, e.g. with RRC signaling or physical layer control signaling, in particular DCI or SCI.

It may be considered that the reference signaling is shifted before precoding is performed for transmission. Alternatively, or additionally, the reference signaling may be shifted after mapping of reference signaling to resource elements. The mapping before shifting may be based on the same sequence, and it may be considered to be utilising the same sequence after shifting as well, in particular if the shift is small.

There is also considered a program product comprising instructions adapted for causing processing circuitry to control and/or perform a method as described herein.

Moreover, a carrier medium arrangement carrying and/or storing a program product as described herein is described.

There may be considered a receiving radio node and/or a method of operating such. The receiving radio node may be adapted for being configured with a shift indication as descried herein, and/or may be configured accordingly. Moreover, the receiving radio node may be adapted for demodulating reference signaling and/or signaling associated thereto based on the shift indication, and/or may perform such demodulating. The receiving radio node may comprise, and/or be adapted for utilising, processing circuitry and/or radio circuitry, in particular a receiver and/or transceiver, for being configured and/or for demodulating. Alternatively, or additionally, the receiving radio node may comprise a corresponding configuration module and/or reception module. A receiving radio node may be implemented as radio node like a UE or terminal, or in some cases as network node. In particular, a receiving radio node may be complementary to the signaling radio node depending on the communication direction of the signaling radio node, e.g. a UE/terminal if the signaling radio node transmits in downlink or sidelink, or a network node if the signaling radio node transmits in uplink.

The approaches described herein limit CM and/or PAPR for reference signaling on multiple layers, allowing more efficient use of radio and/or antenna circuitry, in particular lowering the demands on them, e.g. in terms of linearity. This for example may lower cost for the circuitry, and/or avoid running into non-linear operation. In particular for small shifts, approaches allow transparently shifting signaling, without a receiver needing to become aware that the reference signaling on different layers is shifted. For larger (larger than small), it may be helpful to inform the receiver, e.g. with suitable control signaling.

The reference signaling may utilise QPSK modulation, and/or comprise QPSK modulation symbols. Such a symbol may comprise four code points in phase space, corresponding to four possible values (2 bits). With the shift, the code points may be shifted in phase space. Small shifts may vanish in comparison to phase rotation along the transmission path and/or multipath effects from a receiver's point of view. However, even a small shift can significantly lower the CM and/or PAPR for the transmitter.

In general, the plurality of layers may comprise and/or consist of 2 or at least 2, 4 or at least 4, or 8 or at least 8 layers. A CDM group may comprise 2 or at least 2 layers. Shifts may be for pairs of layers, e.g. a subset may comprise 2 layers. A symbol time interval may correspond to a symbol in a slot or mini-slot in time domain. Reference signaling may extend over multiple symbols in time.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
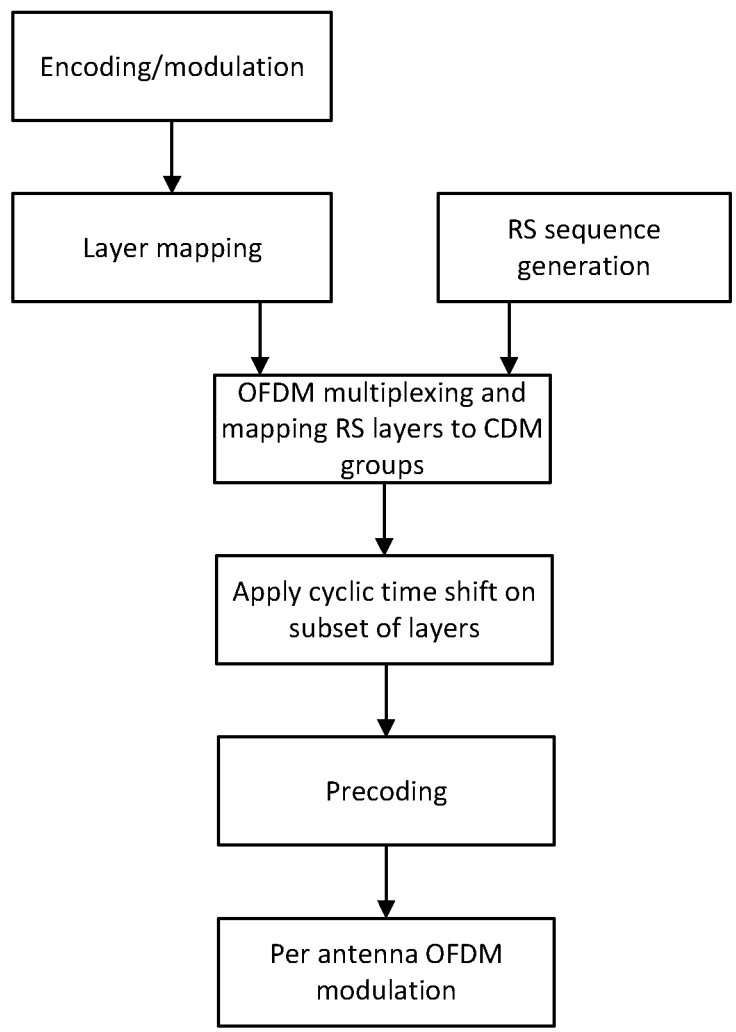
FIG. 1, showing a flowchart of an exemplary method of operating a signaling radio node.

Signal waveforms with low Peak-to-Average Power Ratio (PAPR) and low Cubic Metric (CM) are desirable when designing wireless systems for achieving high operation efficiency of Power Amplifiers (PA). A signal waveform, i.e. a time continuous signal, with high PAPR/CM has large amplitude variations at the input to the power amplifier and may cause severe clipping of the signal when the PA operates near its maximum output transmit power. The clipping causes in-band signal distortion as well as out-of-band spurious emissions that degrade the system performance. To avoid impairments due to clipping one could either increase the linearity requirements on the PA or one could back-off the transmit power such that the probability for clipping is low. Requiring higher linearity of the PA can increase the cost significantly and backing-off the transmit power will evidently reduce the coverage of the transmission. It is thus desirable to keep the PAPR/CM as low as possible.

In the following, the approaches are illustrated by way of example in reference to NR, but they may be implemented also for different RAN/RATs. In the example, the signaling radio node may be a network node, in particular a gNB or transmission point.

The main signal waveform in NR refers to a multi-carrier OFDM signal generation (a.k.a. CP-OFDM) in which physical layer channels and reference signals are directly mapped on a time-frequency grid. The CP-OFDM scheme offers large flexibility in resource utilization to the cost of a waveform with relatively high PAPR/CM. This is a drawback for uplink coverage where transmissions can be power limited. To enhance uplink coverage, transform precoded OFDM signal generation (a.k.a. DFT-spread OFDM or SC-FDM) was adopted as a complementary uplink waveform for which the CM is in the order of 3 dB lower in comparisons to CP-OFDM.

PAPR and CM of these OFDM waveforms should not significantly increase by the design of the reference signals. For the CP-OFDM waveform, the reference signal may be QPSK modulated as $$r(m) = \frac{1}{\sqrt{2}}(1 - 2 \cdot c(2m)) + j\frac{1}{\sqrt{2}}(1 - 2 \cdot c(2m+1)), m = 0, 1, \ldots ,$$

where $c(i)$ refers to a length-31 Gold sequence. The QPSK modulated reference signal will match the PAPR/CM of the CP-OFDM waveform but will not be suitable for the DFT-S-OFDM waveform for which the reference signal is instead derived from a Zadoff-Chu sequence with a PAPR/CM that match the DFT-S-PFDM waveform.

Use of demodulation reference signals (DM-RS) may be considered, e.g. for coherent demodulation of physical layer channels, in particular data channels like PDSCH (DL) and PUSCH (UL). DM-RS may be confined and/or associated to resource blocks carrying the associated PDSCH/PUSCH, and may be mapped on the OFDM time-frequency grid such that the receiver can efficiently handle time/frequency-selective fading radio channels.

NR will use a flexible air interface in which the mapping of the DM-RS on the OFDM time-frequency grid is highly configurable. For example, the DM-RS can be configured with respect to mapping type in the frequency domain (type 1 or type 2 mapping), the start position in time of the DM-RS (type A or type B mapping), the number of additional DM-RS symbols within the transmission interval and the maximum number of supported orthogonal DM-RS ports. In the case of type 1 mapping, the maximum number of orthogonal DM-RS ports is either 4 or 8 whereas for type 2 it is either 6 or 12.

The number of considered DM-RS ports in general may coincide with the number of MIMO layers that are spatially multiplexed, such that one DM-RS port per transmitted layer may be considered. Thus, a single-layer (rank 1) transmission will use a single DM-RS port whereas a two-layer (rank 2) transmission will use two DM-RS ports. Typically, the DM-RS ports used in SU-MIMO transmissions represent a subset of the available DM-RS ports given by the DM-RS configuration and which ports used in the transmission are indicated via the physical downlink control channel (PDCCH). For example, with the DM-RS type 1 supporting up to 4 orthogonal DM-RS ports (indexing the ports with 0, 1, 2 and 3) a single-layer transmission could use one of the four DM-RS ports, a two-layer transmission could in principle use one of the port pairs $\{0,1\}$, $\{0,2\}$, $\{0,3\}$, $\{1,2\}$, $\{1,3\}$, $\{2,3\}$, a three-layer transmission could in principle use one of the port triples $\{0,1,2\}$, $\{0,1,3\}$, $\{0,2,3\}$, $\{1,2,3\}$, whereas a four-layer transmission would use all the available DM-RS ports $\{0,1,2,3\}$. When specifying port combinations to be signaled, only a subset of the possible combinations may be considered, e.g. such that for type 1 (maximum 4 ports) the port pairs are restricted to $\{0,1\}$, $\{2,3\}$, $\{0,2\}$ and three-layer transmission is restricted to the ports $\{0,1,2\}$.

The NR mapping of four DM-RS ports on a resource block and on a single OFDM symbol is illustrated in table 1, where orthogonal cover codes (OCC) of length-2 are used within each CDM group to orthogonalize DM-RS sequences mapped on the same subcarriers. It can be observed that type 1 mapping of the DM-RS sequence ($r(m)$, $m=0, 1, \ldots$ ) has a comb structure and that the type 1 mapping has a denser pattern in the frequency-domain than the type 2 mapping. Comb mapping may be used for transmissions requiring low PAPR/CM and may thus be used in conjunction with DFT-S-OFDM, whereas in CP-OFDM both DM-RS type 1 and type 2 mapping are supported. It can be noticed that mapping type 2 supports three CDM groups but in this illustration CDM group 2 is not used (no type 2 mapping of DM-RS on subcarriers 4,5,10 and 11). Resource elements associated with a CDM group that is (occasionally) not used for DM-RS can be used for PDSCH/PUSCH and by then reduce the overhead. A comb may define a pattern in frequency domain of subcarriers carrying a reference signaling symbol with interspersed subcarriers carrying no symbol, wherein the number of interspersed subcarriers between two symbol carrying subcarriers may be constant. In general, it may be considered that the timing and/or pattern of reference signaling for each layer is known to transmitter and receiver, e.g. based on corresponding control signaling and/or configuring.

After layer-mapping, the DM-RS and associated PDSCH/PUSCH may be precoded to adjust the spatial phases of the transmitted signals such that received signals adds constructively at the intended receiver (and/or destructively at other receivers). The choice of precoder is typically based on channel state information (CSI) acquired either on the receiver side or on the transmitter side. The precoding could be wideband in the sense that the same precoder is applied to all subcarriers or there could be one precoder per sub-carrier. Typically, the precoder is fixed over a bundle of resource blocks. In contrast to uplink, the precoder is standard transparent in downlink.

TABLE 1

Mapping of four DM-RS ports on subcarriers within a resource block.

|  |  |  | Subcarrier | | | | | | | | | | | |
|---|---|---|---|---|---|---|---|---|---|---|---|---|---|---|
|  |  |  | 0 | 1 | 2 | 3 | 4 | 5 | 6 | 7 | 8 | 9 | 10 | 11 |
| Type 1 | CDM group 0 | Port 0: | r(0) | 0 | r(1) | 0 | r(2) | 0 | r(3) | 0 | r(4) | 0 | r(5) | 0 |
|  |  | Port 1: | r(0) | 0 | −r(1) | 0 | r(2) | 0 | −r(3) | 0 | r(4) | 0 | −r(5) | 0 |
|  | CDM group 1 | Port 2: | 0 | r(0) | 0 | r(1) | 0 | r(2) | 0 | r(3) | 0 | r(4) | 0 | r(5) |
|  |  | Port 3: | 0 | r(0) | 0 | −r(1) | 0 | r(2) | 0 | −r(3) | 0 | r(4) | 0 | −r(5) |
| Type 2 | CDM group 0 | Port 0: | r(0) | r(1) | 0 | 0 | 0 | 0 | r(2) | r(3) | 0 | 0 | 0 | 0 |
|  |  | Port 1: | r(0) | −r(1) | 0 | 0 | 0 | 0 | r(2) | −r(3) | 0 | 0 | 0 | 0 |
|  | CDM group 1 | Port 2: | 0 | 0 | r(0) | r(1) | 0 | 0 | 0 | 0 | r(2) | r(3) | 0 | 0 |
|  |  | Port 3: | 0 | 0 | r(0) | −r(1) | 0 | 0 | 0 | 0 | −r(2) | −r(3) | 0 | 0 |

In NR multi-layer transmissions, the DM-RS sequence is mapped to resource elements so that the same sequence points (elements) are reused in multiple CDM groups (see table 1). Together with precoding, this repetition of sequence points may create very high peaks (high PAPR/CM) in the transmitted waveform. This will either incur very high requirements on the transmitter linearity (which drives cost) or cause severe degradation of transmit signal quality.

A proposed solution is to apply a small cyclic time shift or, equivalently, a (e.g., progressive) phase rotation (across frequency) on a subset of the layers (in particular prior to the precoding).

Mapping of DM-RS sequence on port $p_j$ and resource element $a_{k,l}^{(p_j,\mu)}$ with subcarrier index k and OFDM symbol index i for the NR numerology index $\mu$ may be implemented as follows $$a_{k,l}^{(p_j,\mu)} = \beta_{DMRS} r^{(p_j)}(2n+k') \quad (UL)$$
$$k = \begin{cases} 4n + 2k' + \Delta & \text{Configuration type 1} \\ 6n + k' + \Delta & \text{Configuration type 2} \end{cases}$$
$$k' = 0, 1$$
$$l = \bar{l} + l'$$

$$a_{k,l}^{(p_j,\mu)} = \beta_{DMRS}^{PDSCH} r_\lambda^{(p_j)}(2n+k') \quad (DL)$$
$$k = \begin{cases} 4n + 2k' + \Delta & \text{Configuration type 1} \\ 6n + k' + \Delta & \text{Configuration type 2} \end{cases}$$
$$k' = 0, 1$$
$$l = \bar{l} + l'$$
$$n = 0, 1, \ldots$$

Here $r_\lambda^{(p)}(m)$ refers to a QPSK reference signal sequence after applying OCC, which for length-2 FD-OCC implies that $r_\lambda^{(p)}(m) = r(m)$ for even numbered ports and $r_\lambda^{(p)}(m) = (-1)^m r(m)$ for odd numbered ports (see table 1). After mapping DM-RS and PDSCH/PUSCH on M layers associated with the set of ports $\{p_0, \ldots p_{M-1}\}$, the resource elements assigned for the transmission are precoded and transmitted on N transmit antennas. With P denoting a precoding matrix of dimension N|M and $b_{k,l}$ being the signal transmitted on antenna i (on subcarrier k in symbol l) the precoding step can be expressed as $$\begin{pmatrix} b_{k,l}^0 \\ \vdots \\ b_{k,l}^{N-1} \end{pmatrix} = P \begin{pmatrix} a_{k,l}^{(p_0,\mu)} \\ \vdots \\ a_{k,l}^{(p_{M-1},\mu)} \end{pmatrix}.$$

For illustration, a 2-TX scenario with DM-RS mapping type 1 on port 0 (CDM group 0) and on port 2 (CDM group 1) as depicted in table 2 is considered. It should be noted that the port pair {0,2} is a valid signaling port combination in NR for rank 2 transmissions and that the two DM-RS ports are orthogonalized via FDM (i.e. ports on different subcarriers). The following two precoders, $$P_1 = \frac{1}{2}\begin{pmatrix} 1 & 1 \\ 1 & -1 \end{pmatrix} \text{ and } P_2 = \frac{1}{2}\begin{pmatrix} 1 & 1 \\ j & -j \end{pmatrix},$$

may be considered for signaling to the UE.

By applying these precoders to the DM-RS ports in table 2, the transmit antenna mapping depicted in table 3 results (omitting the scaling with ½ for simplicity).

It may be observed that for both these precoders, there will be repetitions of the DM-RS sequence points which in this case degrades PAPR/CM. It can be shown that the CM will be approximately 2.5 dB larger than what is obtained for CP-OFDM, irrespectively if mapping type 1 or 2 is considered. It can though be noticed for mapping type 2, that allocating data on resource elements in the unused CDM group 2 will reduce the CM but still it will be larger than for CP-OFDM.

TABLE 2

DM-RS type 1 mapping with orthogonality obtained via FDM.

|  | k: | 0 | 1 | 2 | 3 | 4 | 5 | 6 | 7 | 8 | 9 | 10 | 11 |
|---|---|---|---|---|---|---|---|---|---|---|---|---|---|---|
| Type 1 | Port 0 (CDM group 0): | r(0) | 0 | r(1) | 0 | r(2) | 0 | r(3) | 0 | r(4) | 0 | r(5) | 0 |
|  | Port 2 (CDM group 1): | 0 | r(0) | 0 | r(1) | 0 | r(2) | 0 | r(3) | 0 | r(4) | 0 | r(5) |

TABLE 3

DM-RS mapping type 1 on ports 0 and 2 after precoding.

| | k: | 0 | 1 | 2 | 3 | 4 | 5 | 6 | 7 | 8 | 9 | 10 | 11 |
|---|---|---|---|---|---|---|---|---|---|---|---|---|---|
| | $b_{k,l}^0$: | r(0) | r(0) | r(1) | r(1) | r(2) | r(2) | r(3) | r(3) | r(4) | r(4) | r(5) | r(5) |
| $P_1$ | $b_{k,l}^1$: | r(0) | −r(0) | r(1) | −r(1) | r(2) | −r(2) | r(3) | −r(3) | r(4) | −r(4) | r(5) | −r(5) |
| $P_2$ | $b_{k,l}^1$: | jr(0) | −jr(0) | jr(1) | −jr(1) | jr(2) | −jr(2) | jr(3) | −jr(3) | jr(4) | −jr(4) | jr(5) | −jr(5) |

As identified above, this systematic repetition of sequence point across all RB in the allocation is the reason for the PAPR/CM deterioration. It is generally proposed applying a frequency dependent phase shift on a subset of the layers. For the above illustration with 2-TX and DM-RS mapping on ports 0 and 2, the frequency dependent phase shift may be applied to one of these ports. In other words, a frequency dependent phase shift may be applied to the DM-RS sequence, $\bar{r}(k)=r(k)e^{j2\pi f(k)}$, and then this sequence may be mapped on e.g. port 2 as illustrated in FIG. 4 with corresponding signals to be transmitted on the two transmit antennas as reference in table 5. The same frequency dependent phase shift is applied to PDSCH/PUSCH mapped on port 2.

TABLE 4

Frequency dependent phase shift.

| | k: | 0 | 1 | 2 | 3 | 4 | 5 | 6 | 7 | 8 | 9 | 10 | 11 |
|---|---|---|---|---|---|---|---|---|---|---|---|---|---|
| Type 1 | Port 0 (CDM group 0): | r(0) | 0 | r(1) | 0 | r(2) | 0 | r(3) | 0 | r(4) | 0 | r(5) | 0 |
| | Port 2 (CDM group 1): | 0 | $\tilde{r}(0)$ | 0 | $\tilde{r}(1)$ | 0 | $\tilde{r}(2)$ | 0 | $\tilde{r}(3)$ | 0 | $\tilde{r}(4)$ | 0 | $\tilde{r}(5)$ |

$\tilde{r}(k)=r(k)e^{j2\pi f(k)}$, applied to port 2.

TABLE 5

Signals transmitted after precoding with phase shift applied to port 2.

| | k: | 0 | 1 | 2 | 3 | 4 | 5 | 6 | 7 | 8 | 9 | 10 | 11 |
|---|---|---|---|---|---|---|---|---|---|---|---|---|---|
| | $b_{k,l}^0$: | r(0) | $\tilde{r}(0)$ | r(1) | $\tilde{r}(1)$ | r(2) | $\tilde{r}(2)$ | r(3) | $\tilde{r}(3)$ | r(4) | $\tilde{r}(4)$ | r(5) | $\tilde{r}(5)$ |
| $P_1$ | $b_{k,l}^1$: | r(0) | −$\tilde{r}(0)$ | r(1) | −$\tilde{r}(1)$ | r(2) | −$\tilde{r}(2)$ | r(3) | −$\tilde{r}(3)$ | r(4) | −$\tilde{r}(4)$ | r(5) | −$\tilde{r}(5)$ |
| $P_2$ | $b_{k,l}^1$: | jr(0) | −j$\tilde{r}(0)$ | jr(1) | −j$\tilde{r}(1)$ | jr(2) | −j$\tilde{r}(2)$ | jr(3) | −j$\tilde{r}(3)$ | jr(4) | −j$\tilde{r}(4)$ | jr(5) | −j$\tilde{r}(5)$ |

This frequency dependent phase shift ensures that the phase relation between repeated sequence points varies across frequency. This significantly improves PAPR/CM to be on par with CP-OFDM (see separate section below). If the frequency dependent phase shift is selected to be smooth, with a very small variation between subcarriers, it will be indistinguishable (to the receiver) from the impact of a time dispersive channel, and the impact on the effective time dispersion may also be very small. In a separate section below, we show that this does not degrade receiver performance in terms of throughput.

Note that the distinction between f(k) and f'(k) (as used in the section above) is due to the mapping of sequence points to the subcarriers is not one-to-one.

$$\begin{pmatrix} b_{k,l}^0 \\ \vdots \\ b_{k,l}^{N-1} \end{pmatrix} = P \begin{pmatrix} a_{k,l}^{(0,\mu)} e^{j2\pi f(k)} \\ \vdots \\ a_{k,l}^{(M-1,\mu)} \end{pmatrix},$$

where it is understood that the frequency dependent phase shift is added to a subset of the layers (the application on layer 0 is solely an example). Also note that the subcarrier dependency in the function $f(k)$ may relate to an index relative to subcarrier 0 in RB 0 (in the language of 3GPP TS 38.211 Release 15.0.0), or relative to, e.g. the allocation of PDSCH/PUSCH.

The shift may be interpreted as per layer small delay CDD. It may be considered $$f(k)=k+k_{offset}/N_{phase},$$

With $N_{phase}$ sufficiently large, this will become a per layer cyclic time shift. To the receiver, it will be indistinguishable from a small propagation delay (with $N_{phase}$ equal to the number of FFT subcarriers, the equivalent time shift is a single sample).

This variant may be considered to represent a small delay CDD applied per layer.

With two layers transmitted, the phase rotation/cyclic shift may be applied to one of the layers as illustrated above. With more than two layers transmitted, the same phase rotation can be applied to all layers within the same CDM group (for mapping type 1 there are only two CDM groups, so only a single-phase rotation is needed). The phase rotation for layers on different CDM groups may be different, e.g. based on a different function. In the case of mapping type 2 and no phase rotation applied to layers associated with CDM group 0, the second and third CDM groups should thus have different phase rotations. It may be generally considered that a subset comprises layers/ports of different CDM groups. At least one or exactly one layer of a subset may be non-shifted, and/or different layers of a subset may have applied different shifts (e.g., different frequency dependent functions for the shift) applied.
allocation) may be applied without detrimental effect on performance (in this example, the allocation corresponds to 600 subcarriers).

The approaches generally may be applied on the transmitter side for downlink and/or uplink, and/or for sidelink. Wideband and/or subband precoding may be utilised, e.g. for a carrier or bandwidth part, or on subcarrier level (or PRB level). Applicability is not limited by RB bundling.

FIG. 1 shows a flowchart of actions of an exemplary method of operating a signaling radio node. In FIG. 1, the actions correspond to:

Encoding modulation: maps the transmitted data to a stream of QAM symbols (per codeword).

Layer mapping: maps the codeword to one or more layers per codeword (the number of layers in total is the transmission rank.

RS sequence generation: creates the reference signal sequence including OCC code OFDM multiplexing: maps the reference signal sequence and the data layers to resource elements in the OFDM time/frequency grid.

Apply cyclic time shift on subset of layers: As described above.

Precoding: This is described above for precoding in the frequency domain (but in some implementation, this may also be done in time domain, or a combination of time and frequency domain). The precoding maps layers to tx antennas.

Per antenna OFDM modulation: This creates the time domain signal per tx antenna (or per layer if precoding is done in time domain).

The proposed approaches may be implemented standard transparent, or with changes to a standard. They can dramatically improve PAPR/CM without impact on receiver performance, while being implementable with low processing overhead.

Figure 2:
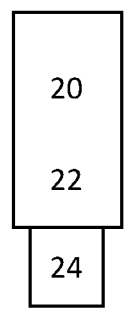
FIG. 2, showing an exemplary radio node implemented as UE.

FIG. 2 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 3:
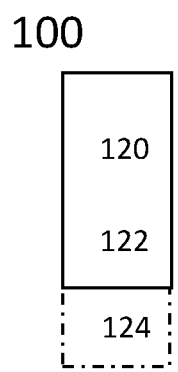
FIG. 3, showing an exemplary radio node implemented as network node.

FIG. 3 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered.

Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangements associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise
Abbreviation Explanation
ACK/NACK Acknowledgment/Negative Acknowledgement
ARQ Automatic Repeat reQuest
CAZAC Constant Amplitude Zero Cross Correlation
CBG Code Block Group
CDM Code Division Multiplex
CM Cubic Metric
CQI Channel Quality Information
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DM(-)RS Demodulation reference signal(ing)
FDM Frequency Division Multiplex
HARQ Hybrid Automatic Repeat Request
IFFT Inverse Fast Fourier Transform
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
(P)SSCH (Physical) Sidelink Shared Channel
RB Resource Block
RRC Radio Resource Control
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SVD Singular-value decomposition
TDM Time Division Multiplex
UCI Uplink Control Information
UE User Equipment
URLLC Ultra Low Latency High Reliability Communication
VL-MIMO Very-large multiple-input-multiple-output
ZF Zero Forcing Abbreviations may be considered to follow 3GPP usage if applicable.

The invention claimed is:

1. A method of operating a signaling radio node in a radio access network, the signaling radio node being adapted for transmitting on a plurality of layers utilizing an antenna arrangement; wherein the method comprises transmitting, on each of the plurality of layers, reference signaling in the same symbol time interval, wherein reference signaling on at least a first layer of the plurality of layers is shifted in time and/or phase relative to reference signaling on at least a second layer of the plurality of layers, wherein the shift corresponds to a shift in time domain smaller than a cyclic prefix associated to transmission on the layer, and wherein each layer is associated with a different reference signaling port of a plurality of reference signaling ports, and the reference signaling ports are mapped to subcarriers according to different sequences, mapping the reference signaling ports to the subcarriers comprising a type 1 mapping and a type 2 mapping, the type 1 mapping comprising a comb structure and wherein the type 1 mapping comprises a denser pattern in a frequency-domain than the type 2 mapping.

2. A method according to claim 1, wherein transmission on different layers shares antenna elements of the antenna arrangement.

3. A method according to claim 1, wherein for each layer, the reference signaling is mapped in frequency domain to subcarriers according to one of the different sequences.

4. A method according to claim 1, wherein the reference signaling is a demodulation reference signal and the demodulation reference signal is shifted by applying a phase shift to elements of a sequence associated to a layer.

5. A method according to claim 1, wherein reference signaling on the at least first layer is based on the same sequence as reference signaling of the at least second layer.

6. A method according to claim 1, wherein a layer corresponds to a transmission beam.

7. A method according to claim 1, wherein a receiving radio node is configured with a shift indication by the signaling radio node.

8. The method of claim 7, wherein the signaling radio node is configured to transmit the shift indication with control signaling to the receiving radio node.

9. A method according to claim 1, wherein the reference signaling is shifted before precoding is performed for transmission.

10. A method according to claim 1, wherein the reference signaling is shifted after mapping of reference signaling to resource elements.

11. A non-transitory storage medium comprising instructions adapted for causing processing circuitry to control and/or perform a method according to claim 1.

12. The method of claim 1, wherein the shift is about 10% or less than the cyclic prefix associated to the transmission on the layer.

13. The method of claim 1, wherein the plurality of layers is grouped into Code Division Multiplex (CDM) groups using Orthogonal Cover Codes (OCC).

14. A signaling radio node for a radio access network, the signaling radio node being adapted for transmitting a plurality of layers utilizing an antenna arrangement; the signaling radio node further being adapted for transmitting, on each of the plurality of layers, reference signaling in the same symbol time interval, wherein reference signaling on at least a first layer of the plurality of layers is shifted in time and/or phase relative to reference signaling on at least a second layer of the plurality of layers, wherein the shift corresponds to a shift in time domain smaller than a cyclic prefix associated to transmission on the layer, and wherein each layer is associated with a different reference signaling port of a plurality of reference signaling ports, and the reference signaling ports are mapped to subcarriers according to different sequences, mapping the reference signaling ports to the subcarriers comprising a type 1 mapping and a type 2 mapping, the type 1 mapping comprising a comb structure and wherein the type 1 mapping comprises a denser pattern in a frequency-domain than the type 2 mapping.

15. A signaling radio node according to claim 14, wherein transmission on different layers shares antenna elements of the antenna arrangement.

16. A signaling radio node according to claim 14, wherein for each layer, the reference signaling is mapped in frequency domain to subcarriers according to one of the different sequences.

17. A signaling radio node according to claim 14, wherein the reference signaling is a demodulation reference signal and the demodulation reference signal is shifted by applying a phase shift to elements of a sequence associated to a layer.

18. A signaling radio node according to claim 14, wherein reference signaling on the at least first layer is based on the same sequence as reference signaling of the at least second layer.

* * * * *